Dec. 12, 1939. C. DAVIS 2,183,304
APPARATUS FOR FORMING EXTRUSION CONTAINERS
Filed April 22, 1937 6 Sheets-Sheet 1

Inventor
Charles Davis

Dec. 12, 1939.  C. DAVIS  2,183,304
APPARATUS FOR FORMING EXTRUSION CONTAINERS
Filed April 22, 1937   6 Sheets—Sheet 3

Inventor
Charles Davis
By
Atty.

Dec. 12, 1939.   C. DAVIS   2,183,304
APPARATUS FOR FORMING EXTRUSION CONTAINERS
Filed April 22, 1937   6 Sheets-Sheet 5

Inventor
Charles Davis
by J. Lurine
Atty.

Patented Dec. 12, 1939

2,183,304

UNITED STATES PATENT OFFICE 2,183,304

APPARATUS FOR FORMING EXTRUSION CONTAINERS

Charles Davis, Neuilly-sur-Seine, France

Application April 22, 1937, Serial No. 138,452
In Great Britain July 28, 1936

7 Claims. (Cl. 153—73)

The invention concerns an apparatus for carrying out a method as described in my copending application filed on even date herewith, Serial No. 138,453, now Patent No. 2,129,120, of providing an extrusion container made of metal such as lead, tin or aluminum, for example, the well known collapsible plain tubular container used for fluid or semi-fluid substances such as toothpaste, cosmetics, ointment, paints, polishing compounds and the like, with pleats of V-shape, and preferably of a sharply defined V-shape, so that the extrusion container can be easily and regularly collapsed axially or longitudinally and, moreover, with such pleats which extend outwardly relatively to the plain tube from which they are formed.

The apparatus according to the invention comprises an expansible and contractible multi-plate mould, the plates which have operative edges so shaped that when the mould is contracted, they co-operate to form alternate ridges and grooves of sharply defined V shape, into which expanded mould, the plain metal tube or container is inserted and when the mould is contracted, the tube is compelled to conform to the internal surface thereof by internal pressure, that is, that of a fluid pressure medium, for example, compressed air, or the substance which the container is ultimately to contain and which is forced in under pressure. The tube or container is thus provided with outward V-shaped pleats. It is a practically non-resilient and easily axially collansible extrusion container.

The apparatus includes a plunger for insertion in the open end of the plain tubular container in the mould and this plunger, in its preferred form, is provided with a duct for the introduction of the pressure medium.

The apparatus in its preferred form further comprises means for facilitating and controlling the expansion and contraction of the mould, means for opening and closing it laterally, and other devices and combinations of devices hereinafter referred to for ensuring accurate and rapid operation.

In the accompanying drawings:

Figure 1 is a diagrammatic section through a part of the mould, with an ordinary collapsible tube in position, before the mould is contracted axially, Figure 2 being a similar view, but showing the mould contracted.

Figure 4 being a plan of one of the plates, and

Figure 7 is a side elevation of a pleated tube as removed from the mould as formed without filling.

Figure 12 shows the mould closed, and

Figure 13 shows the mould contracted.

Figures 1, 2, 7:
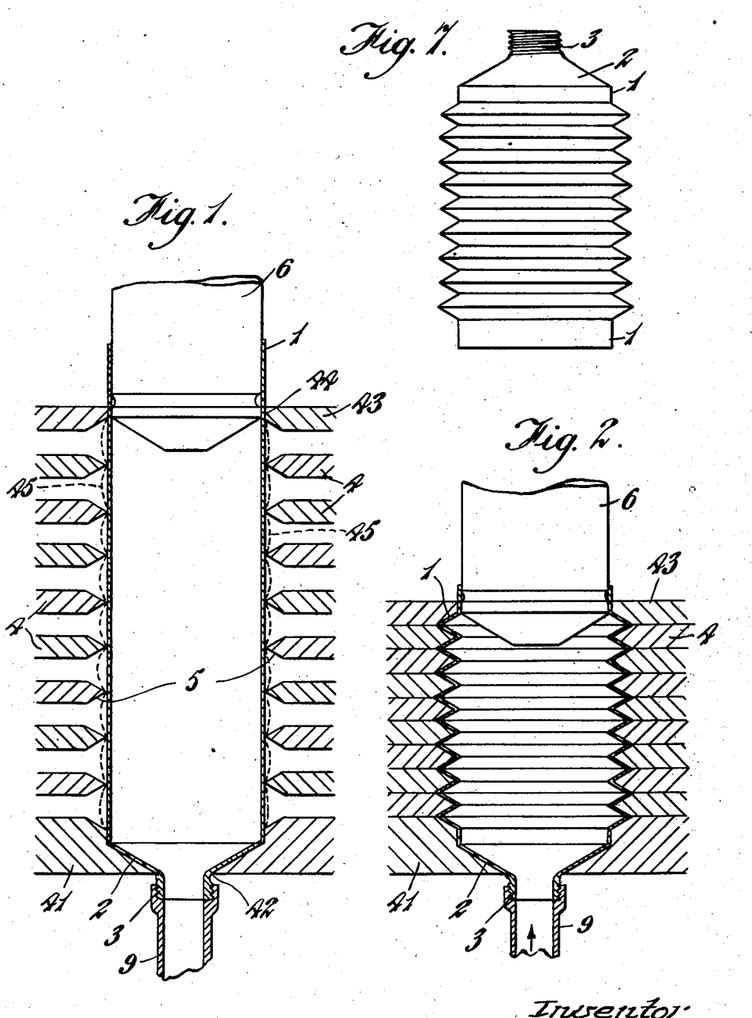

Referring first to Figures 1 and 2, a tin or lead tube 1 as usually employed hitherto as a collapsible container, provided with a conical nozzle 2 and screw-threaded nipple 3, is inserted in a mould comprising a number of plates 4, each presenting an internal circular edge 5 of V-shape in cross-section. The angle of this V is preferably about 62°.

The tube 1 is inserted while the mould is expanded, that is, while the plates 4 are separated as indicated in Figure 1.

The lowermost plate 41 is shaped to conform to the nozzle 2 and has a central hole 42 to allow the nipple 3 to protrude so that it can be connected to a fluid supply pipe, for example, a supply pipe for compressed air. The uppermost plate 43 has a cylindrical hole 44.

A plunger 6 is inserted in the open end of the tube 1. This end of the tube may be a fairly good fit on the plunger and the plunger may have packing rings or grooves to prevent the undue escape of air.

Compressed air under light pressure is first admitted through the nipple 3 so that the inflated tube is pressed outwardly against the sharp edges 5 of the plates 4, a slight bulge of the tube occurring between each adjacent pair of edges as indicated in dotted lines 45, Figure 1. A slight contraction in the length of the tube may occur under these conditions. The nozzle end of the tube being held, the other end of the tube is free to allow for this contraction as the plunger 6 takes the internal pressure.

The mould is then contracted until the plates 4 are in close contact with a resulting increase in the pressure of the air in the tube.

The tube 1 then assumes the sharply defined pleated form indicated in the mould in Figure 2. The air supply pipe is then disconnected from the nipple 3 and the pleated tube is removed and has the appearance shown in Figure 7.

In order to remove the pleated container from the mould, it is necessary that the plates 4 and 43 shall each be made in sections capable of being moved apart laterally. Such a form of mould will now be described with reference to Figures 3 to 6 as well as a simple form of apparatus capable of being used with a fluid or pasty substance which is intended to be used as a pressure medium and also for filling the pleated container.

Figures 4, 9:
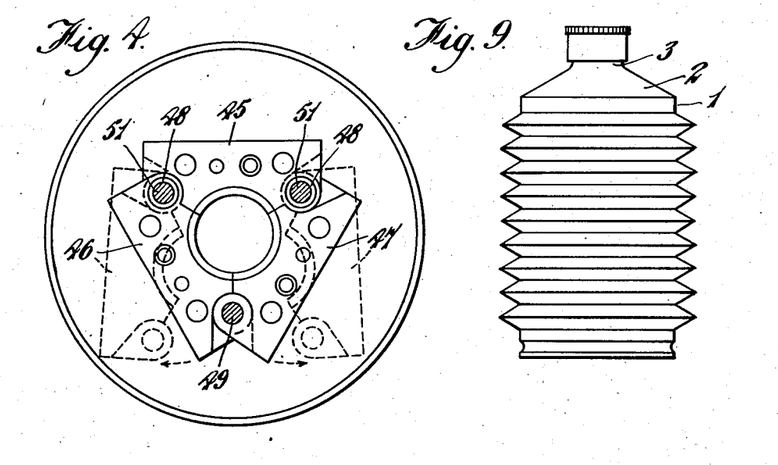

The mould comprises a number of plates 4, a plate 41, and a plate 43, each composed of three sections 45, 46 and 47, Figure 4.

The sections of each plate have interengaging parts or joints and the section 45 is pivotally connected at its joints with the sections 46 and 47 by ferrules 48, 48. A removable rod 49 having a handle 50 (Figure 3) at its upper end passes through all the joints between the sections 46 and 47 when the sections are in the condition shown in Figure 4. When the rod 49 is withdrawn, the sections 46 and 47 of each plate may be moved apart laterally as indicated by the dotted lines in Figure 4, so that the mould can be opened.

Figure 3:
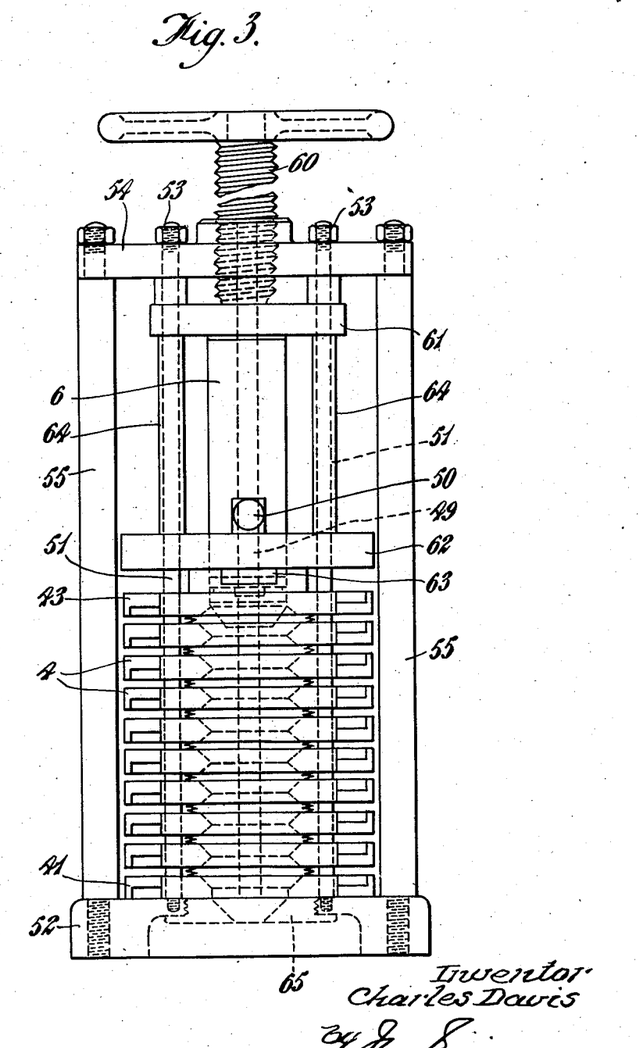
Figure 3 is a side elevation of a mould.

The plates 4 are mounted to slide on rods 51, Figures 3 and 4, which are screwed at their lower ends in a base 52 and secured by nuts 53 at the upper ends in a yoke 54 which is firmly mounted on pillars 55 similarly attached to the base 52 and to the yoke 54.

Springs 56 arranged in recesses in adjacent plates 4 tend to separate them. The spacing of the plates is determined by studs 57, each stud being screwed into one plate and freely sliding in a hole in the adjacent plate and having a head 58. Recesses 59 are provided for the reception of these heads.

When the mould plates 4 are assembled in the apparatus as shown in Figure 3, they are capable of being pressed together by a screw 60 which acts on a cross-head 61 sliding on the rods 51 and transmitting pressure to a pressure plate 62 by means of distance sleeves 64 on the rods 51.

The cross-head 61 also presses on a plunger 6 which passes through a hole in the pressure plate 62. The pressure plate 62 has a boss 63, which engages with the uppermost mould plate 43.

Figures 5, 6:
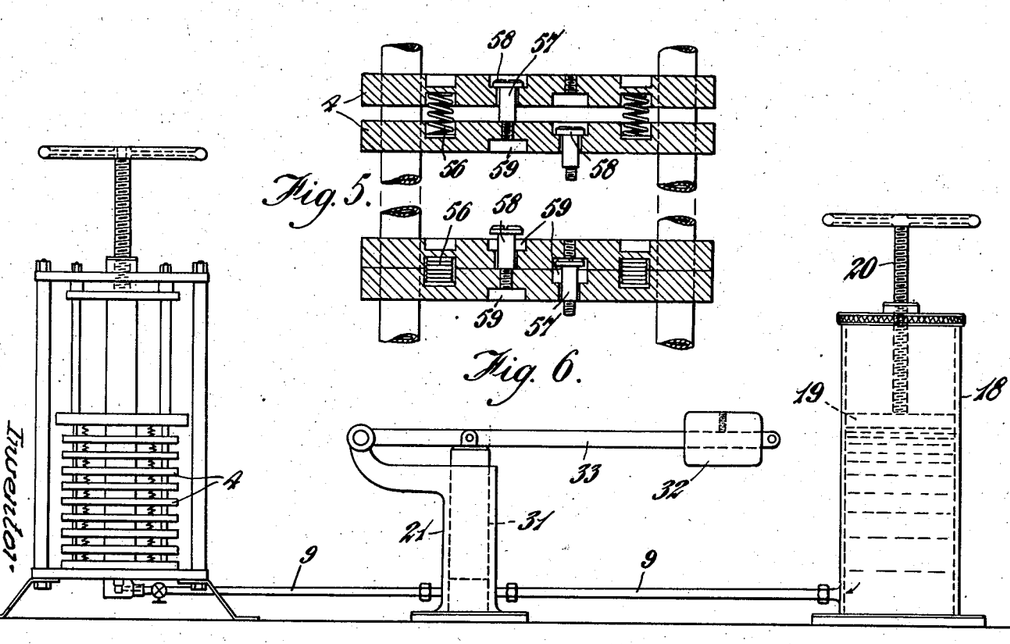
Figure 5 being a sectional elevation through several plates.
Figure 6 is a diagrammatic layout of a mould and pressure medium supply system.

The lowermost plate 41 rests on the base plate 52 which is provided with the bushing 65 having a hole shaped to conform to the nozzle 2 and allowing the nipple 3 to protrude. When the mould is used for both filling and forming the container, the nipple is connected to means for supplying fluid or pasty substance. Such means is indicated in Figure 6.

It will be assumed that a lead or tin tube has been inserted in the mould while the plates 4 are separated by their springs 56, that is, with the mould in the expanded condition. The nipple 3 of the tube 1 is connected to a pipe 9 which is connected to a pressure regulator 21 which is fitted with a plunger 31 loaded by an adjustable weight 32 and a lever 33.

The regulator 21 is connected by the pipe 9 to a source of supply for the pressure medium, in this example diagrammatically illustrated by a storage cylinder 18 fitted with a piston 19 operated by a screw 20.

If the pressure medium is a fluid or pasty substance which is to constitute the ultimate contents of the pleated container, the plunger 6 is first inserted right down in the tin, aluminum or lead tube 1 so as to expel air therefrom before the connection is made to the supply pipe 9.

The pressure medium is then supplied by operating the screw 20 gradually so that the tube in the mould is filled and the plunger is raised until arrested by the cross-head 61, the pressure of the medium being only sufficient to do this. The screw 20 is then slightly operated still further to apply a light internal pressure to the tube in the expanded mould so that the tube is pressed against the sharp V edges 5 of the mould plates 6 and a slight bulging of the tube between those edges occurs.

The screw 60 is then operated to contract the mould and cause the plunger 6 to follow the contraction. This sets up a higher pressure in the fluid or pasty medium in the tube or container, any excess substance expelled through the small orifice of the nipple passing into the pipe 9. The regulator 21 automatically affords accommodation for excess substance and prevents an unduly high pressure occurring.

As the mould is contracted, the tin, lead or aluminum tube or container is pleated.

The pleats are outward pleats, that is, extend outwardly relatively to the tube 1 and are sharply defined.

The pressure may be relieved by operation of the screw 20 or by closing a valve 10 on the pipe 9 while the pipe is disconnected from the nipple of the tube or container. The mould is then opened after removal of the rod 49 and the filled pleated tube or container is removed.

Figure 8:
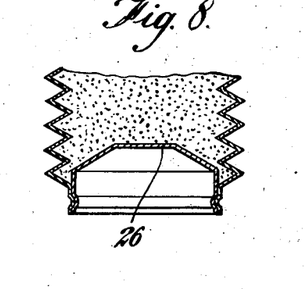
Figure 8 is a side sectional elevation of part of a filled and sealed container, Figures 9 and 10 being side elevations, respectively, of the filled and completed container ready for use and of the container after it has been collapsed to extrude its contents.

The open end of the filled container is fitted with a stopper or piston 26 (Figure 8), which may be of metal or other suitable material.

Figure 10:
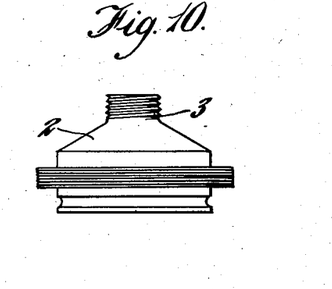

The filled pleated container, shown in Figure 9, thus manufactured can be collapsed axially, as is shown in Figure 10, to extrude its contents through the nipple 3. The container will stand erect on the stopper 26. It may be placed in a protective casing although it is capable of being used without such a casing.

When compressed air is used to form the container, it is not necessary to start with the plunger 6 at the bottom of the tube as there is no need to expel air from it. The cylinder 18 diagrammatically shown in Figure 6 may be utilised as a pump or compressor to force air into the mould or the mould may be connected to any suitable source of compressed air. Instead of a pressure regulator as shown at 21, a suitable safety valve may be employed in the compressed air line.

In place of the springs 56 inserted between the plates 4, 41 and 43, the plate 43 may be pulled up by springs, the remainder of the plates being separated and spaced apart correctly by means of the studs 57, as in the example later to be described.

In the accompanying drawings, the thickness of the tube has been shown exaggerated for the sake of clearness, but in practice, the ordinary tubes having a thickness of about .1 to .2 millimetre can be used.

Instead of the fluid or semi-fluid or pasty substance being introduced through the nozzle of the tube while in the mould, it may be introduced through a duct in the plunger, the duct being connected by a flexible or telescopic connection to a supply pipe which may have a pressure regulator on it as in the example above described.

It will be noticed that in the example illustrated in Figures 1 to 3, the upper and lower mould plates 43 and 41 are so shaped that tubular ends or parts of the tube 1 are left plain, the pleated part of the body extending outwardly beyond the circumference of these parts. The tubular ends are shown in Figures 7 to 10.

The upper end, as shown in Figures 7 and 10, is finished off with a conical nozzle 2 having a nipple 3 of usual form, but a flat, domed or other shaped nozzle and appropriate cap can be provided, the nozzle having round holes, slits or other shaped orifices.

Figure 11:
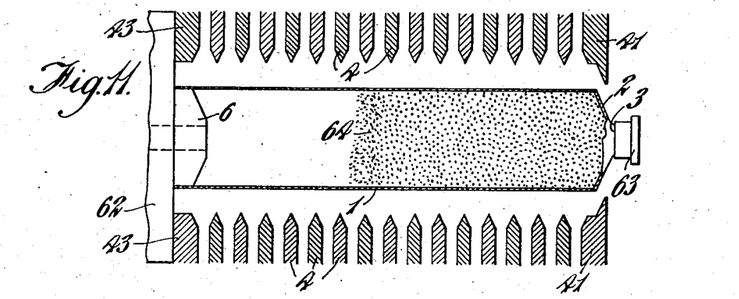
Figure 11 is a diagrammatic section through a part of a modified mould in the open condition with a tube inserted.

A modification of the apparatus described above is illustrated by Figures 11, 12 and 13, it being assumed that the mould plates 4 are provided with the devices shown in Figures 4 and 5, similar reference numerals indicating corresponding parts in the various figures. In this modified apparatus, the plunger 6 is provided with a duct 62 through which the pressure medium, for example, compressed air, is introduced to the tube 1, the nipple 3 on the nozzle 2 of which is closed by the usual cap 63 before the tube is inserted in the open mould, as indicated in Figure 11.

Figures 12, 13, 16:
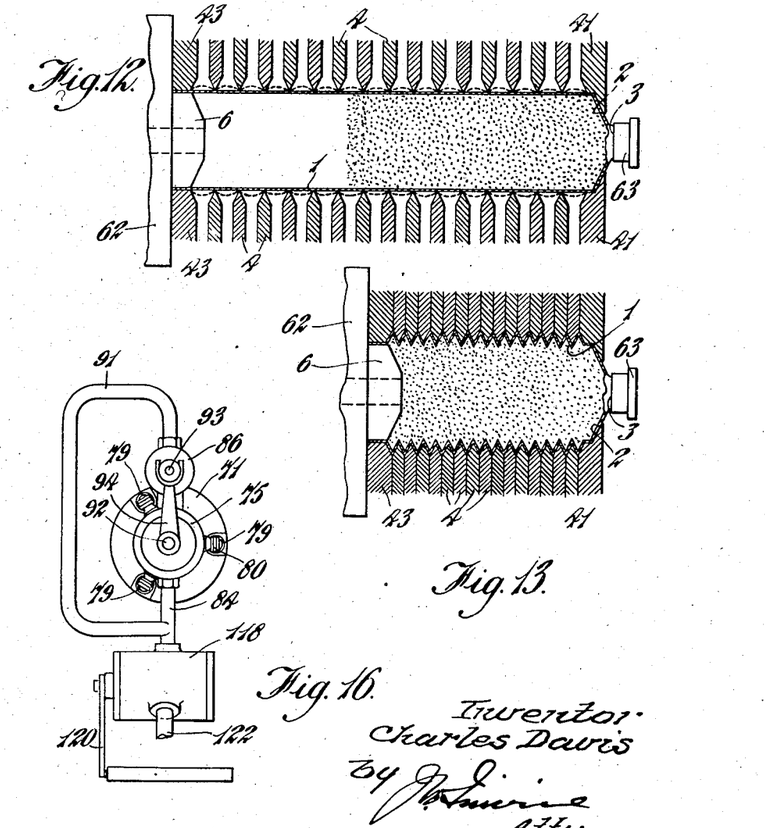

If an empty container is inserted, the mould plates 4 are closed laterally as shown in Figure 12. Compressed air is then admitted to bulge slightly or mark off the tube 1, as indicated by dotted lines in Figure 12. The mould is then collapsed, that is, the plates 4 are closed together as indicated in Figure 13, the flange or cross-head 61 and plunger 6 being moved relatively to the stationary plate 41, the internal pressure of the compressed air being maintained so that the container or tube 1 is provided with sharply defined outward pleats. Before the tube or container 1 is inserted in the mould, it may be dosed with the substance it is ultimately to contain, as indicated by 64, the compressed air acting on this substance during the pleating operation to maintain the internal pressure.

The apparatus shown in Figures 14 to 17 is fitted with a multi-plate mould of similar construction to that described with reference to Figures 4 to 6 and similar reference numerals indicate corresponding parts. In the present example, however, the segments 45, 46, 47 of the plates 4 and also those of the end plates 41 and 43 are not interconnected. Each group of segments 45, 46 and 47 is independently mounted on a rod 51 so as to slide thereon and the segments have dovetailed portions 64 sliding in correspondingly slotted jaws 65 of a holder or support 66 which is similar to a three-jaw chuck and is fitted internally with any usual scroll or geared mechanism common to lathe chucks, for adjusting the jaws 65 radially, for instance, when a key is applied to one of the usual operating spindles 124. The jaws 65 when moved radially inwards and outwards bring the segments of the plates 4 together and apart to close and open the mould for the insertion and removal of a container.

Figure 14:
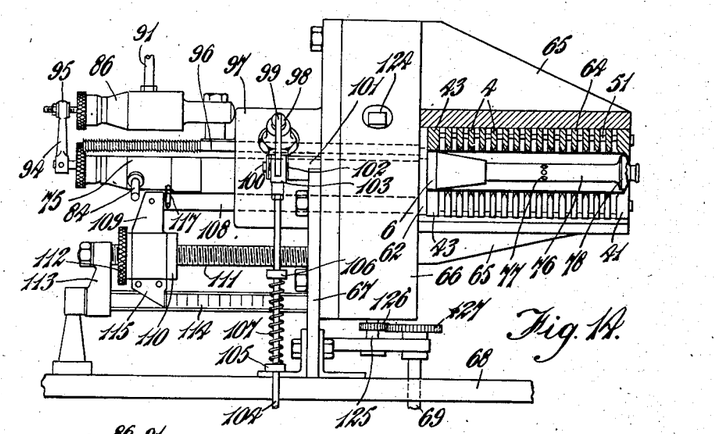
Figure 14 is a side elevation of a further form of apparatus, the mould being in section on the line XIV—XIV, Figure 17.

For rapid operation, one of the spindles 124 is shown in Figure 14 provided with a key 125 having a toothed wheel 126 meshing with a larger toothed wheel 127, which is mounted on a shaft 69 which can be rotated by a hand wheel, pedal, or by power, for example, from an electric motor, these details not being shown as they are obvious to a skilled mechanic.

The support or chuck 66 is fixed by a bracket 67 to a machine plate or bed 68.

The plunger 6 is screwed into the end of a sleeve 69' so that it can be easily removed and replaced by one of different size or shape. The sleeve 69' has a flange or cross-head 62 which bears against the end plate 43 when the mould is to be contracted. The rods 51 are fixed in the cross-head 62.

The sleeve 69' slides in a cylindrical bore 70 in a mandrel 71 which is fixed in the chuck 66. The end of the sleeve 69' remote from the cross-head 62 is fitted with an annular piston 72 provided with a cup leather packing 73. The piston 72 and bore 70 thus constitute a pneumatic motor or piston and cylinder device for contracting the mould. The piston 72 slides on an air tube 74 which is screwed in a valve box 75 which is screwed on the adjacent end of the mandrel 71. The other end of the air tube 74 is screwed to an air tube extension 76 having holes 77 and provided with a conical end 78 to correspond with the nozzle 2 of the metal tubular container 1 which is to be pleated. The extension 76 can be removed and the plunger 6 shown in Figure 14 can be replaced by a shorter plunger 6, as indicated in Figures 11 to 13, when a container is to be pleated which is precharged with pasty or other contents as hereinbefore described with reference to Figures 11 to 13. Return springs 79 are secured at 80 to the valve box 75 and at 81 to the cross-head 62.

Figures 15, 17:
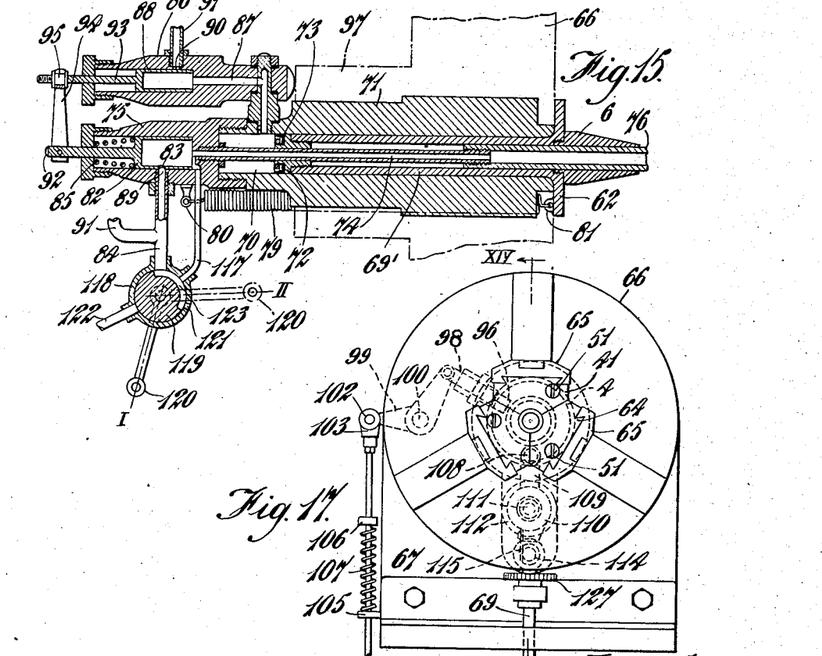
Figure 15 is a side sectional elevation of the plunger and parts associated therewith, Figure 16 being an end view corresponding thereto.
Figure 17 is an end view showing the mould and the chuck or support therefor.

A sliding sleeve valve 82 is open at one end to the air tube 74 and closed at the other end. It has a port 83 which in the position of the valve shown in Figure 15 is open to a port 89 and thence to an air supply pipe 84 so that air can pass to the air tube 74 and thence to the tubular container 1. A spring 85 tends to hold the valve 82 in this position.

Another valve box 86 is mounted adjacent to the valve box 75. It has an air duct 87 leading to the cylinder 70. It contains a sliding sleeve valve 88 which is open at one end adjacent to the duct 87 and is closed at the other end. When in the position shown in Figure 15, the valve 88 closes a port 90 and, therefore, prevents air from an air supply pipe 91 passing to the duct 87 and into the cylinder 70. The valves 82 and 88 have stems 92 and 93, respectively, which are yoked together by a yoke 94. The two valves 82 and 88 are thus compelled to reciprocate together. The stem 93 is screw-threaded to receive a flanged screw-threaded collar 95 embracing the adjacent end of the yoke 94. The valve stem 93 can thus be adjustably connected to the yoke 94 so that the position of the valve 88 can be varied or set relatively to the valve 82 for the purpose of ensuring that the valve 82 closes the port 89 before the valve 88 opens the port 90 after an appropriate interval of time to allow compressed air to pass to a container in the mould before compressed air passes to the cylinder 70 to force the piston 72 forward and by means of the cross-head 62 to contract the mould.

A ratchet bar 96, which is fixed at one end to the cross-head 62, slides in the boss 97 of the chuck 66. A detent 98 for engagement with the ratchet bar 96 is mounted to slide radially in the boss 97. It is pivotally connected at its outer end to one arm of a bell-crank 99 which is pivotally mounted at 100 fixed in a boss 101 on the chuck 66. The other arm of the bell-crank 99 is pivotally connected by a pin 102 to the forked end 103 of a rod 104 sliding through a lug 105 on the bracket 67. The rod 104 has a collar 106 fixed to it and a coiled spring 107 abuts against the collar 106 and the guide lug 105.

When the crosshead 62 moves forward to collapse the mould, the ratchet bar 96 moves with it and the spring 107 allows the detent 98 to slip over the teeth of the ratchet bar, but the spring 106 enables the detent 98 to engage with the teeth of the ratchet bar and prevent the return of the crosshead until the rod 104 is pulled down by the operator, for example, by a pedal.

In order that the return movement of the crosshead 62 may be definitely but variably determined, a stop bar 108 is provided, against the end of which the crosshead 62 abuts. The stop-bar 108 is slidably mounted in the boss 97 and is attached to a member 109 embracing a nut 110 which is mounted on a stationary screw 111. The nut 110 has a milled head 112 by which the operator can rotate it. The screw 111 is mounted at one end in the bracket 67 and at the other end in a bracket 113 which is fixed to the machine bed 68. A gauge or scale bar 114 is fixed to the brackets 67 and 113. A pointer 115 is carried by the member 109 and indicates on the gauge the adjustment of the stop bar 108 and, therefore, of the determined return position of the crosshead 62 which has to be set to suit the mould being used, it being understood that the mould is removable from the jaws 65 and can be replaced by another having a different number of mould plates 4 to suit the length of container to be pleated.

The air supply pipe 91 branches off the air supply pipe 84. The pipe 84 and a vent pipe 117 from the valve box 75 are connected to the casing 118 of an operator's control valve 119 which is provided with a handle 120. The casing 118 has a vent 121. A main air supply pipe 122 is connected to the casing 118. The control valve 119 is a rotary plug valve and has a port 123.

The operation of the apparatus is as follows:

Assuming that the mould is expanded, the mould plates 4 being in the position indicated in Figure 11, and that a plain tubular container 1 has been placed on the plunger 6, the chuck 66 is then operated to close the jaws 65 and the mould, the mould plates 4 closing together radially into the position indicated in Figures 12 and 14. The parts shown in Figure 15 will be then in the position shown in that figure.

The operator then moves the handle 120 from position I to position II, so that the port 123 connects the main air supply pipe 122 to the air pipe 84 and compressed air passes to the valve boxes 75 and 86, and first through the ports 89 and 83, and air tube 74 to the inside of the container 1, slightly bulging it or marking it off by pressing it between the spaced plates 4 (Figure 12). The pressure of air in the valve 82 forces it back against its spring 85 so that the ports 89, 83 are closed. At the same time, the valve 88 is drawn back by the yoke 94 and the port 90 is uncovered and compressed air passes through the duct 87 into the cylinder 70 and forces the piston 72 forward, so that the crosshead 62 contracts the mould until the mould plates 4 are in close contact (Figure 13). This operation together with the pressure inside the container 1 pleats the container. In the meantime, the ratchet bar 96 will have moved relatively to the detent 98. The operator then moves the handle 120 from position II to position I to cut off the air supply to the pipes 84 and 91, and to bring the port 123 of the control valve 119 into position to connect the air pipes 84 and 91 and the vent pipe 117 to the vent 121. The pressure inside the container 1, the air tube 74, the valve 82 and the cylinder 70 is thus relieved. The spring 85 moves the valves 82 and 88 forward to their original positions, but the piston 72 cannot return under the action of the springs 79 as the detent 98 is in engagement with the ratchet bar 96. The operator then operates the chuck 66 by the shaft 69, so that the jaws 65 move apart radially and carry the plates 4 out with them. The pleated container can then be removed from the plunger 6 and another plain tubular container 1 be placed in position. The operator then pulls down the rod 104, the detent 98 releases the ratchet bar 96 and the piston 72 and crosshead 62 are returned to their original positions so that the mould is expanded, that is, the mould plates 4 are again spaced as in Figure 11.

I claim:

1. An apparatus for forming a metal non-resilient axially collapsible pleated tubular extrusion-container for fluid, semi-fluid and pasty substances, comprising a multi-plate expansible and contractible mould, the plates of said mould having operative edges of sharply defined V shape, means for radially expanding and radially contracting said mould, means for introducing a fluid pressure medium into a metal tubular container placed in said mould while said mould is radially contracted, and means controlled by the said fluid introducing means to cause fluid under pressure to longitudinally contract said mold into final form.

2. An apparatus for forming a metal non-resilient axially collapsible pleated tubular extrusion-container for fluid, semi-fluid and pasty substances, comprising a multi-plate expansible and contractible mould, the plates of said mould having operative edges of sharply defined V shape, and being composed of segments adapted to be moved radially to permit of the insertion of a metal tubular container to be pleated, and to be moved together radially after said insertion, springs between said plates for spacing them longitudinally, means for limiting the longitudinal spacing between the plates, a plunger adapted to be inserted into the open end of said inserted tubular container, said plunger having a duct for the introduction of pressure medium into said container, and means for compelling said plunger to longitudinally contract said mold to compel said tubular container to conform to the V shaped edges of the mould plates and thereby to form V-shaped pleats in the container.

3. An apparatus for forming a metal non-resilient axially collapsible pleated tubular extrusion-container for fluid, semi-fluid and pasty substances, comprising a multi-plate expansible and contractible mould, the plates of said mould being composed of segments and having operative edges of sharply defined V shape, a chuck for supporting said mould having radially adjustable jaws, each jaw carrying one set of segments of mould plates, means for adjusting said jaws radially to open and close the mould for the purpose of permitting the insertion and removal of a tubular container, a plunger adapted to be inserted into the open end of a container when inserted in said mould, said plunger having a duct for introducing pressure medium to said tubular container, and means for axially moving said plunger independently of said duct to compel said mold to axially contract while maintaining pressure in said container through the duct for the purpose of compelling said tubular container to conform to the V shaped edges of the mould for the purpose of forming V shaped pleats in said container.

4. An apparatus for forming a metal non-resilient axially collapsible pleated tubular extrusion-container for fluid, semi-fluid and pasty substances, comprising a multi-plate axially expansible and contractible mould, the plates of said mould having sharply defined V-shaped operative edges and being composed of radially cooperating segments, a chuck for supporting said mould having radially adjustable jaws, each carrying one set of said segments, means for radially adjusting said jaws for the purpose of opening and radially closing the mould for the insertion and removal of a tubular container, a plunger for insertion in the open end of an inserted container and for contracting said mould, said plunger having a duct for compressed air for introduction to said container when said mould is radially closed but expanded axially, a piston connected to said plunger, a cylinder for said piston, means for controlling the supply of compressed air to the duct in the plunger, for the purposes of supplying air to the container, independent means for controlling the supply of compressed air to said cylinder for moving said plunger forwards to contract the mould longitudinally and for the purpose of compelling the container to conform to the V-shaped edges of the mould plates and receive outward pleats, and means for retracting said plunger to expand said mould, the means for controlling the supply of compressed air to the duct in the plunger automatically controlling the means for admitting compressed air to the cylinder for moving the plunger to contract the mold.

5. An apparatus for forming a metal non-resilient axially collapsible pleated tubular extrusion-container for fluid, semi-fluid and pasty substances as specified in claim 2, comprising a cylinder and piston for moving the plunger for axially contracting the mould, separate air valves for controlling the supply of compressed air to the duct in the plunger to charge the container and to the cylinder for operating the piston to force the plunger forward, and means for causing the valve for controlling the duct to automatically control the opening of the valve for governing the plunger movement, the relation of the valves providing that the container is charged with compressed air before the valve controlling the plunger movement is opened.

6. An apparatus for forming a metal non-resilient axially collapsible pleated tubular extrusion-container for fluid, semi-fluid and pasty substances as specified in claim 2, having a cylinder and piston for moving the plunger for contracting the mould, and provided with springs for returning the piston and plunger, an adjustable stop for limiting the return movement thereof, a ratchet bar on said plunger, a detent for engagement with said ratchet bar and means for operating said detent to release said bar and thereby the plunger when the mould is to be expanded.

7. An apparatus for forming a metal non-resilient axially collapsible pleated tubular extrusion-container for fluid, semi-fluid and pasty substances, comprising a longitudinally expansible and contractible multi-plate mould composed of radially separable segments having cooperating operative edges of sharply defined V shape, a reciprocatory crosshead for expanding and contracting said mould longitudinally, said crosshead having a plunger for insertion in the open end of a tubular metal container placed in the mould, said plunger having a duct for charging said container with compressed air, a piston and cylinder device operable by compressed air for moving said crosshead forward to contract said mould, springs for moving said crosshead backward for expanding said mould, means for retaining said crosshead in its forward position after contracting said mould and for releasing said crosshead when the mould is to be expanded, a normally open control valve for admitting air under pressure through said duct, a normally closed control valve for governing the admission of air under pressure to the plunger, the normally closed control valve being automatically opened by the movement of the normally open control valve to closed position.

CHARLES DAVIS.